United States Patent
Deore et al.

(10) Patent No.: US 8,658,759 B2
(45) Date of Patent: Feb. 25, 2014

(54) SWITCHABLE SELF-DOPED POLYANILINE

(75) Inventors: Bhavana A. Deore, Winnipeg (CA); Insun Yu, Winnipeg (CA); Michael S. Freund, Winnipeg (CA)

(73) Assignee: University of Manitoba, Winnipeg (CA)

( * ) Notice: Subject to any disclaimer, the term of this patent is extended or adjusted under 35 U.S.C. 154(b) by 542 days.

(21) Appl. No.: 10/581,752

(22) PCT Filed: Dec. 6, 2004

(86) PCT No.: PCT/CA2004/002083
§ 371 (c)(1),
(2), (4) Date: Dec. 20, 2006

(87) PCT Pub. No.: WO2005/054338
PCT Pub. Date: Jun. 16, 2005

(65) Prior Publication Data
US 2007/0093644 A1    Apr. 26, 2007

Related U.S. Application Data

(60) Provisional application No. 60/526,603, filed on Dec. 4, 2003.

(51) Int. Cl.
*C08G 73/00* (2006.01)
(52) U.S. Cl.
USPC ........................................................ 528/422
(58) Field of Classification Search
USPC ........................................................ 528/422
See application file for complete search history.

(56) References Cited

U.S. PATENT DOCUMENTS

| 6,797,152 B2 | 9/2004 | Freund |
| 2002/0029979 A1 | 3/2002 | Freund |
| 2003/0055212 A1* | 3/2003 | Freund et al. .................. 528/422 |

FOREIGN PATENT DOCUMENTS

| CA | 1277989 | 12/1990 |
| CA | 2086820 | 11/1992 |
| CA | 2229089 | 2/1997 |

OTHER PUBLICATIONS

Bray and Petersen, 1998, Naturforsch., A: Phys Sci 53a: 273-284.
Bryce et al., 2001, J Phys Chem A 105: 3633-3640.
Chan et al., 1994, Macromolecules 27: 2159-2164.
Chen et al., 1998, J Phys Org Chem 11: 378-386.
Crawford, 1982, Polym Test 3: 37-54.
Deore, B., Freund, M.S., Analyst, 2003, 128, 803-806, first published Apr. 29, 2003 (entire document).
Epstein et al., in Spectroscopy of Advanced Materials, John Wiley & Sons, New York: 1991.
Frydman and Harwood, 1995, J Am Chem Soc 117: 5367-5368.
Gangopadhyay and De, 2002, Synth Met 132: 21-28.
Groziak et al., 1994, J Am Chem Soc 116: 7597-7605.
Gustafsson et al., 1992, Nature 357: 477-479.
Han et al., 2003, Macromolecules 36: 7908-7915.
Hopfl and Farfan, 1998, Can J Chem 76: 1853-1859.

(Continued)

*Primary Examiner* — Shane Fang

(57) ABSTRACT

A substituted polyaniline whose self-doped state can be controlled via complexation between boronic acid groups along the backbone with D-fructose in the presence of fluoride is described. For the first time, this allows the formation of a water-soluble, self-doped conducting polymer under the polymerization conditions. In turn this facilitates the growth of polyaniline over a wider pH range.

25 Claims, 4 Drawing Sheets

(56) References Cited

OTHER PUBLICATIONS

Jager et al., 2000, Science 288: 2335-2338.
Kliegel et al., 2000, Can J Chem 78: 1325-1344.
Krumova, 2001, Compos Sci Technol 61: 557-563.
Liu et al., 1999, Polymer 40: 5285-5296.
Massiot et al., 1990, J Magn Reson 90: 231-242.
Mattoso et al., 1994, Synth Met 68: 1-11.
Mohler and Czarnik, 1993, J Am Chem Soc 115: 7037-7038.
Nicolas et al., 2000, Eur J Org Chem 9: 1703-1710.
Samoson and Lippmaa, 1983, Phys Rev B 28: 6567-6570.
Shoji, E., Freund, M.S., J. Am. Chem. Soc., 2002, 124, 12486-12493 (entire document).
Tsorta and Friedrich, 2004, Synth Met 143: 237-242.
Vedejs et al., 2000, J Am Chem Soc 122: 3047-3052.
Veprek, 1999, J Vac Sci Technol A 17: 2401-2420.
Wei et al., 1989, J Polym Sci, Part A: Polym Chem 27: 4351-4363.
Wrackmeyer, in Annual Reports on NMR Spectroscopy, Academic Press, London: 1988.
Yue et al., 1991, Synth Met 41: 765-768.
Zamfirova et al., 2003, J Appl Poly Sci 88: 1794-1798.
Deore, B. A. et al., Journal of the American Chemical Society, 2004, 52-53, 126(1).
Supplementary European Search Report for European Application No. 04 80 2260, 2009.
European Patent Office. Examination Report for European Patent Application No. 04802260.2. Dated Jul. 8, 2010.
European Patent Office. Examination Report for European Patent Application No. 04802260.2. Dated Aug. 2, 2011.
Canadian Intellectual Property Office. Office Action for Canadian Patent Application No. 2,548,510. Dated Oct. 4, 2011.
E. Pringsheim et al. A Polyaniline with Near-Infrared Optical Response to Saccharides. Advanced Materials (1999) vol. 11 p. 865.
B. A. Deore et al. Conducting Poly(anilineboronic acid) Nanostructures: Controlled Synthesis and Characterization. Macromol. Chem. Phys. (2008) vol. 209 pp. 1094-1105.
J. T. English et al. Biogenic amine vapour detection using poly(anilineboronic acid) films. Sensors and Actuators B. (2006) vol. 115. pp. 666-671.
B. A. Deore et al. Macromol. Chem. Phys. pH Dependent Equilibria of Poly(anilineboronic acid). Saccharide Complexation in Thin Films (2006) vol. 207. pp. 660-664.
I. Yu et al. Thermal Stability of High Molecular Weight Self-Doped Poly(anilineboronic acid). Macromolecules (2005) vol. 38 pp. 10022-10026.
B.A. Deore et al. Reactivity of Poly(anilineboronic acid) with NAD and NADH. Chem. Mater. (2005) vol. 17 pp. 2918-2923.
C.L. Recksiedler et al. Substitution and Condensation Reactions with Poly(anilineboronic acid): Reactivity and Characterization of Thin Films. Langmuir (2005) vol. 21 pp. 3670-3674.
B. A. Deore et al. Electroactivity of Electrochemically Synthesized Poly(Aniline Boronic Acid) as a Function of pH: Role of Self-Doping. Chem. Mater. (2004) vol. 16 pp. 1427-1432.
E. Shoji et al. Potentiometric Sensors Based on the Inductive Effect on the pKa of Poly(aniline): A Nonenzymatic Glucose Sensor. J. Am. Chem. Soc. (2001) vol. 123. pp. 3383-3384.
E. Shoji et al. Poly(aniline boronic acid): A New Precursor to Substituted Poly(aniline)s. Langmuir (2001) vol. 17 No. 23.

* cited by examiner

A

B

SWITCHABLE SELF-DOPED POLYANILINE

PRIOR APPLICATION INFORMATION

The present application claims priority on U.S. Ser. No. 60/526,603, filed Dec. 4, 2003.

FIELD OF THE INVENTION

The present invention relates generally to the field of polymers and polymer chemistry. More specifically, the present invention relates to a switchable self-doped polyaniline and its interconversion between self-doped and non-self-doped forms.

BACKGROUND OF THE INVENTION

Polyaniline, one of the most promising intrinsically conducting polymers, has received considerable attention in recent years due to its straightforward polymerization, chemical stability, relatively high conductivity and potential applications in electronic devices, batteries and sensors. A major breakthrough in the field was the discovery of self-doped polyaniline due to its desirable properties. For example, the self-doped form of polyaniline has several advantages including better solubility as well as redox activity and conductivity over a wider pH range. However, there are a number of tradeoffs including reduced mechanical stability (especially in the presence of good solvents) and decreased conductivity due to steric effects. Ideally, it should be possible to switch between self-doped and non-self-doped states so that the properties of the polymer can be manipulated to achieve desired properties during synthesis, processing, and finally use of the polymer.

Herein we report a novel approach to the creation of a substituted polyaniline whose self-doped state can be controlled via complexation between boronic acid groups along the backbone with D-fructose in the presence of fluoride. For the first time, this allows the formation of a water-soluble, self-doped conducting polymer under the polymerization conditions. In turn this facilitates the growth of polyaniline over a wider pH range. This has important implications toward synthesis (yield, molecular weight), processing (controlled precipitation), and implementation (extended pH range).

SUMMARY OF THE INVENTION

According to a first aspect of the invention, there is provided a self-doped polyaniline capable of converting between:

a water-soluble self-doped form comprising repeating units as shown in (2) of FIG. 1; and a water-insoluble non-self-doped form comprising repeating units as shown in (1) of FIG. 1, wherein the water-soluble form is converted to the water-insoluble form by reducing fluoride or fructose concentration of the polymer solution.

According to a second aspect of the invention, there is provided a method of making a self-doped polyaniline comprising:

(a) providing monomer (1), D-fructose and fluoride;

(b) incubating the monomer (1), the D-fructose and the fluoride under conditions suitable for polymerization, thereby producing polymer (2);

(c) precipitating the polymer (2) by reducing the fluoride concentration, thereby producing polymer (1).

According to a third aspect of the invention, there is provided a polymer capable of converting between a self-doped form and a non-self doped form by a reversible chemical reaction. In the examples described herein, the polymer is polyaniline and the reactive components are boronic acid, D-fructose and fluoride. As will be appreciated by one of skill in the art, other suitable polymers, substituents and reactive components may also be used within the invention.

DESCRIPTION OF THE PREFERRED EMBODIMENTS

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described. All publications mentioned hereunder are incorporated herein by reference.

Herein we report a novel approach to the creation of a substituted polyaniline whose self-doped state can be controlled via complexation between boronic acid groups along the backbone with D-fructose in the presence of fluoride. For the first time, this allows the formation of a water-soluble, self-doped conducting polymer under the polymerization conditions. In turn this facilitates the growth of polyaniline over a wider pH range. This has important implications toward synthesis (yield, molecular weight), processing (controlled precipitation), and implementation (extended pH range). Specifically, the percent yield of the polymer produced is approximately 60%.

As will be known to one of skill in the art, the prior art teaches polyaniline and other self-doped polyanilines having low molecular weights on the order of 10's of thousands. In a very few cases, polymers have been made having higher molecular weights approaching one million. However, the method of producing these polymers is very tedious and results in low yields. This is in contrast with the instant invention, wherein polymers having molecular weights on the order of a million or more are produced with high yields.

In one embodiment of the invention, there are provided polyaniline polymers having a molecular weight ranging from oligomers (4 or more monomer units also known as a 4-mer) to polymers having a molecular weight of 2 million. Preferably, the molecular weight of the polyaniline polymers range from 10,000 to 2,000,000. More preferably, the molecular weight of the polyaniline polymers ranges from 100,000 to 2,000,000. In other embodiments, the molecular weight of the polyaniline polymer is at least 10,000 or at least 100,000.

Described herein are exemplary examples for preparation of the polymer. However, as will be apparent to one of skill in the art, any suitable concentration range, ratio, oxidant and/or temperature that is known in the literature may be used in the instant invention.

Figure 1:
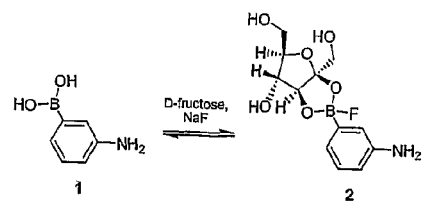
FIG. 1 shows the structure of the monomer (1) and the boronate ester thereof (2).

The complexation of saccharides with aromatic boronic acids is pH dependent and can result in a neutral or anionic ester depending on solution conditions. Addition of fluoride can be used to enhance the complexation of saccharides under less basic conditions and facilitates the formation of an anionic ester. Under neutral pH condition in the presence of excess D-fructose (10 M) and one equivalent of fluoride, $^{11}$B NMR indicates that the monomer (1) is converted to a boronate ester (2) (both shown in FIG. 1) which can in turn form the basis of a self-doped polyaniline. As will be appreciated by one of skill in the art, the polymerization can take place from a pH of 8 down to 0. In a preferred embodiment, the pH may range from 1 to 8, from 2 to 8, from 3 to 8, from 4 to 8, from 5 to 8, from 6 to 8 or from 7 to 8.

The requirement as shown in prior art is that an anionic species be covalenty attached along the backbone of the polymer. The first demonstration used concentrated sulphuric acid to react with polyaniline resulting in a sulfonated backbone. The degree of sulfonation (i.e., the percent of the repeat units that had a sulfonate on it) was ill-defined. In subsequent work, people have shown other anions that can be attached on the backbone.

Oxidative polymerization of (2) was carried out under ambient conditions with the addition of ammonium persulfate, resulting in a water soluble, self-doped polymer (vide infra). Poly(2) was precipitated by reducing the fluoride concentration via dilution. Following filtering and rinsing with water, the precipitate could be redissolved in an aqueous solution containing the original D-fructose and fluoride concentrations.

As will be appreciated by one of skill in the art, other suitable oxidants may be used and will be apparent to one of skill in the art. One exception is peroxide, which is often used for polymerization, but it would not work in the instant invention. In the above example, "ambient" means room temperature and 1 atmosphere of pressure. However, one who is skilled in the art would know that it will work at any temperature from the boiling point of the liquid down to its freezing point. Furthermore, specific pressure doesn't really have any meaning when dealing with solutions.

Figure 2:
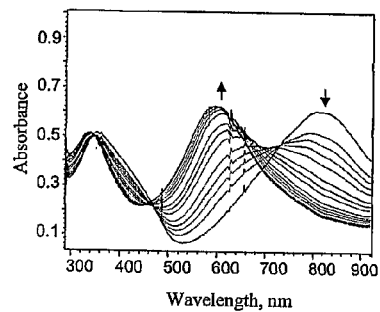
FIG. 2 shows the UV-vis spectral changes of a poly(2) thin film as a function of time upon exposure to pH 7.4 phosphate-buffered saline over the course of an hour.

The UV-vis spectra of the soluble form of poly(2), shown in FIG. 2, (in the presence of D-fructose and fluoride) as well as thin films of the precipitated form of poly(2) are similar to those of the emeraldine salt form of unsubstituted polyaniline, exhibiting absorption bands near 350 nm and 820 nm due to the $\pi$-$\pi$* and bipolaron band transitions respectively. The existence of these bands in pure water indicates that poly(2) exists in a self-doped state.

Poly(2) was converted to poly(1) by the removal of D-fructose from the polymer in phosphate buffer saline solution. The conversion to the non-self-doped state and subsequently to the emeraldine base form of the polymer is characterized by the appearance of an absorption band at 600 nm and the disappearance of the peak at 820 nm as shown in FIG. 2. The switching behavior is reversible by exposing the base form of poly(1) to the original concentrations of D-fructose and fluoride either in phosphate buffer saline or pure water.

Figure 3:
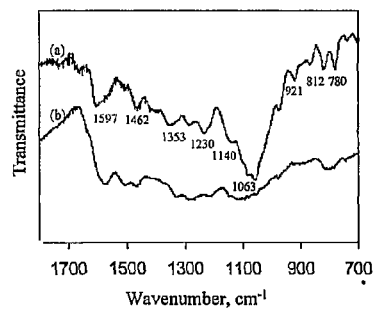
FIG. 3 shows the IR spectra of (a) poly(2) and (b) poly(1).

Switching between the self-doped and non-self-doped state is further supported by IR spectra and elemental analysis. The IR spectra of poly(2) and poly(1) are shown in FIG. 3. Characteristic IR bands attributed to the poly(2) form occur at 1597, 1462, 1353, 1230, 1140, 921, 812 and 780 cm−1. The ratio of the relative intensities of quinoid to benzenoid ring modes (I~597/I~1462) clearly shows that the percentage of imine units is higher than amine units and the polymer is therefore in its conductive self-doped form. The band at 1063 cm−1 is attributed to C—O stretching and bending modes in the D-fructose moiety. Following conversion to poly(1) the spectra exhibits reduced intensity for all bands, which is consistent with the emeraldine base form of polyaniline and is due to charge carrier motion connected with lower conductivity of the polymer. The disappearance of the 1063 cm−1 band further supports the conclusion that D-fructose is removed from the polymer to form poly(1) in a non-self-doped state.

Elemental analysis of the two forms of the polymer is consistent with the UV-vis and IR results. Atomic ratios of the poly(2) confirmed the presence of somewhat more than one equivalent of D-fructose bound to the boronic acid group on the backbone (C:N:O: theoretical-12:1:6 and experimental-16:1:11). In the case of poly(1), the atomic ratios (C:N:O; theoretical-6:1:2 and experimental-6:1:2) are similar to that of the uncomplexed monomer, indicating that D-fructose is no longer present in the polymer and that it is therefore in a non-self-doped state.

As will be apparent to one of skill in the art, the polyaniline is used in a variety of applications ranging from organic light emitting diodes to anti-corrosion coatings. The ability to manipulate its solubility, molecular weight, thermal stability and hardness will impact those applications as well as enable the use of this polymer in applications that have not been envisioned yet due to current limitations in its mechanical properties.

Figure 4:
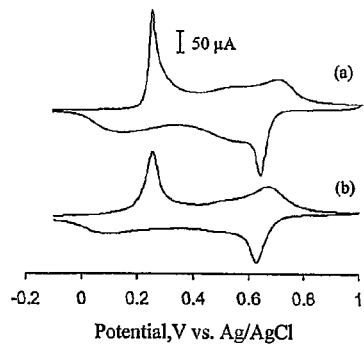
FIG. 4 shows the cyclic voltammograms of (a) an electrochemically deposited film and (b) a film cast from precipitate of poly(1) on glassy carbon in 0.5 M HCl at a scan rate of 100 mV s−1.

Thin films of poly(2) that had been converted to poly(1) exhibit electrochemical behavior similar to films of poly(1) deposited electrochemically under acidic conditions in the presence of fluoride alone (see FIG. 4). In addition, the redox behavior is similar to that observed for unsubstituted polyaniline which shows two sets of redox peaks at ~0.18 and 0.74 V, suggesting facile conversion between oxidation states. Consequently, it appears that polymerization under the conditions reported herein has no detrimental influence on the electronic properties of the polymer.

Since poly(2) is soluble under the reported polymerization conditions, it was not expected to suffer from effective termination of polymerization resulting from precipitation and in turn the limited molecular weight observed for polyaniline. Gel permeation chromatography of poly(1) and poly(2) in N-methylpyrrolidone was performed to determine the molecular weight of the polymers produced. Poly(1) and poly(2) exhibited single chromatographic peaks with weight-average molecular weights of 2.2 and 1.9 million respectively and polydispersities of approximately 1.2 in both cases.

As will be understood by one of skill in the art; 2.2 million and 1.9 million are values for two different definitions of molecular weight. Furthermore, this clearly indicates that polymers having at least that molecular weight can easily be achieved using the instant method. Furthermore, it will be apparent to one of skill in the art that lower molecular weight polymers can easily be attained as well.

In conclusion, a novel substituted polyaniline has been synthesized with the unique ability to switch between a self-doped and a non-self-doped state. In its self-doped state, the polymer is soluble under the polymerization conditions and can be easily and reversibly converted into the insoluble non-self doped form. The ability to take advantage of the properties of both states of the polymer allows unprecedented control over the polymer during synthesis, processing and utilization.

Here the novelty lies in the ability to process (solubility), to obtain higher molecular weights and the ability to reverse the self-doped process, yielding to higher conductivity and more limited solubility as discussed herein.

As will be appreciated by one of skill in the art, the above described polymers may be used in any suitable application, for example, electronics, energy storage, catalysis, chemical sensing and biochemistry.

The invention will now be explained by way of examples. It is to be understood however that the examples are for illustrative purposes only.

3-Aminophenylboronic acid hydrochloride salt, D-fructose and ammonium persulfate were purchased from Aldrich Chemical Inc. Sodium fluoride and pH 7.4 phosphate buffer saline stock solution (10×), were purchased from Fisher Scientific. Bulk distilled water was first filtered and ion exchanged to yield 18.3 MΩ quality water using an EasyPure RF, Barnstead Thermolyne Model 7031.

Preparation of Poly(2). Water soluble poly(2) in the presence of D-fructose and fluoride was synthesized as follows: aqueous 40 mM ammonium persulfate (0.5 ml, oxidizing agent) was slowly added over a period of 10 min to an aqueous mixture (19.5 ml) of 40 mM 3-aminophenylboronic acid, 40 mM sodium fluoride and 10 M D-fructose. The pH of the reaction mixture was 7 before adding oxidizing agent. The mixture was stirred overnight at room temperature. In a similar manner poly(2) could also be prepared in phosphate buffer saline solution (pH 7.4). The water soluble poly(2) formed using both methods was easily passed through a 0.02 μm Anotop filter (Whatman). The polymer produced under these conditions was readily precipitated by diluting the solution (~3× volume with pure water) and in turn reducing the fluoride concentration. The resulting precipitate was redispersed in water and centrifuged more than 20 times to remove the excess D-fructose and reactants.

Characterization. UV-vis spectra were obtained using an Agilent 8453 spectrophotometer. Cyclic voltammetric measurements were performed using a CH Instrument CHI-660 workstation controlled by a PC. A three electrode cell was used, which consisted of a glassy carbon disk working electrode (Bioanalytical Systems, 3.0-mm diameter), a platinum coil auxiliary electrode, and a Ag/AgCl reference electrode. Cyclic voltammograms were conducted in a 0.5 M HCl aqueous solution with a scan rate of 100 mV-s−1 Infrared spectra were obtained using a Bomem FT-IR spectrometer (Hartmann and Braun). Polymer samples were mixed with KBr powder to prepare pellets for IR measurements. $^{11}$B NMR studies were carried out using a Bruker AMX 500 NMR spectrophotometer. The monomer samples used for NMR measurements were prepared using 10% $D_2O$ in phosphate buffer saline solution (pH 7.4). Monomer sample preparation details are given in Table 1. Elemental analyses were carried out by Chemisar Laboratories Inc.

Figure 5:
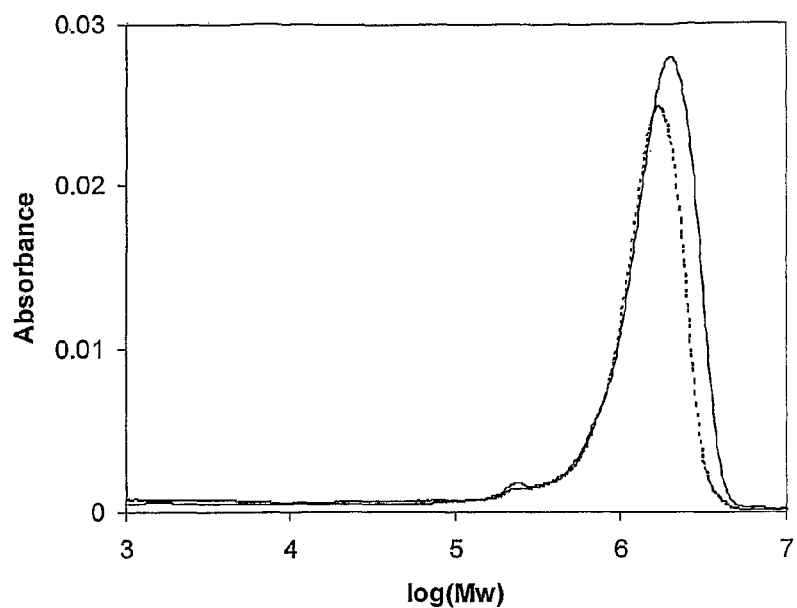
FIG. 5 shows GPC chromatographs for 0.033 mg/ml of poly(1) (solid line) and poly(2) (dashed line) dissolved in NMP.

Molecular weight was determined with gel permeation chromatography (GPC) using polystyrene standards to calibrate the column in NMP (see FIG. 5). A Polymer Laboratories Inc. PLgel 5 μm MIXED-C column was used, operating at 70° C. The concentration of the polymer samples were 0.033 mg/ml. A MiniDAWN Tristar detector (Wyatt Technology), operating at 690 nm, was used as the absorbance detector. Prior to GPC experiments the polymers were dissolved in NMP with constant stirring for 48 h and filtered through a 0.02 μm Anotop filter.

Inherently conducting polymers have had a profound impact on a wide range of emerging technologies from polymer-based electronics (Gustafsson et al., 1992, Nature 357: 477-479) to microrobotics (Jager et al., 2000, Science 288: 2335-2338). However, the use of these materials in mechanically and thermally demanding environments has been limited due to the low molecular weight (Mattoso et al., 1994, Synth Met 68: 1-11) and the volatility of dopants (Yue et al., 1991, Synth Met 41: 765-768) produced with conventional synthetic methods. To date, attempts to address these issues through crosslinking (Gangopadhyay and De, 2002, Synth Met 132: 21-28; Tsorta and Friedrich, 2004, Synth Met 143: 237-242; Chan et al., 1994, Macromolecules 27: 2159-2164; Liu et al., 1999, Polymer 40: 5285-5296) have not been successful in yielding enhanced mechanical properties while maintaining good conductivity. This is likely due to the incompatibility of the volume reduction accompanying crosslinking and the presence of counter ions. Here we demonstrate a new strategy utilizing a chemically modified conducting polymer (poly(anilineboronic acid)) that forms anionic crosslink sites. In so doing, a self-doped, crosslinked conducting polymer is formed, possessing unprecedented hardness while maintaining conductivity. This strategy offers a completely new approach that may be used to enhance the physical properties of conducting polymers without resorting to the creation of composites or other modification procedures that compromise the desirable electronic properties of the polymer.

Figure 6:
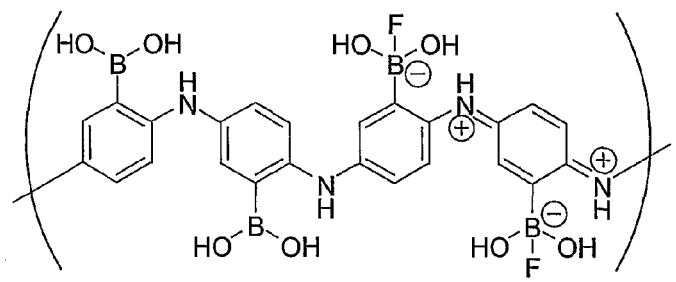
FIG. 6. Emeraldine salt form of poly(aniline boronic acid) A, self-doped in the presence of fluoride. Proposed crosslink B, resulting from an interchain dehydration reaction between a boronic acid-imine and a boronic acid moiety, hence maintaining a self-doped state.
Figure 6:
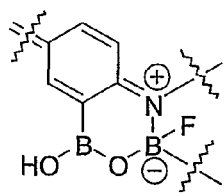

Poly(aniline boronic acid) (PABA) exhibits unique self-doping properties through the formation of four-coordinate boronate species in the presence of fluoride (Nicolas et al., 2000, Eur J Org Chem 9: 1703-1710). The presence of boronic acid groups along the conjugated backbone of polyaniline (FIG. 6A) also offers many possibilities for chemical modification and reactivity. For example, aryl boronic acid chemistry is rich with examples of the formation of boron chelates (Mohler and Czamik, 1993, J Am Chem Soc 115: 7037-7038; Kliegel et al., 2000, Can J Chem 78: 1325-1344; Hopfl and Farfan, 1998, Can J Chem 76: 1853-1859). Two cases closely related to the system described herein include fluorine containing salicaldimine-boron complexes (Vedejs et al., 2000, J Am Chem Soc 122: 3047-3052) and the dimer of 2-aminophenylboronic acid formed in aprotic solvents and in the solid state (Groziak et al., 1994, J Am Chem Soc 116: 7597-7605). These compounds exist as six-member heterocyclic complexes containing a boron-imine dative bond, and are air stable.

In our approach we exploit similar chemistry resulting from the intermolecular reaction between boronic acid groups and imines in PABA containing fluoride to produce crosslinks with an analogous structure involving four-coordinate boron (FIG. 6B), in order to produce a self-doped, crosslinked polyaniline. The key advantage of such a structure is that the crosslink site can also act as a dopant site. In turn, this structure can accommodate the volume shrinkage associated with crosslinking while maintaining the anionic dopant required for conductivity. This results in a crosslinked conducting polymer that should exhibit enhanced hardness and thermal stability.

Figure 7:
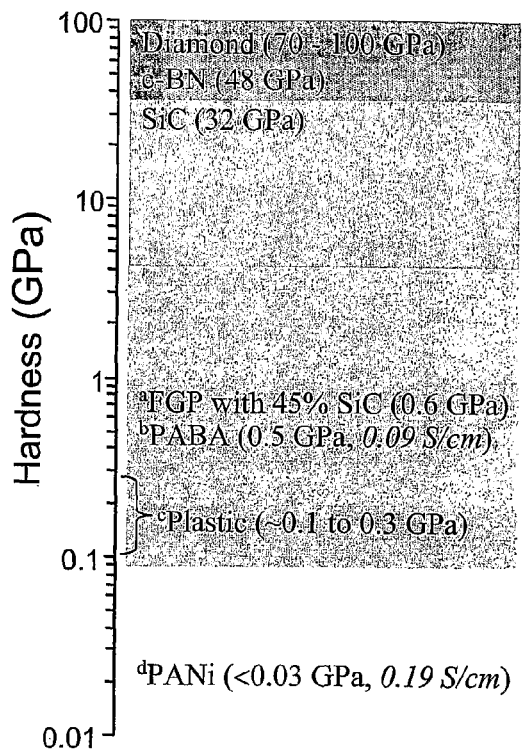
FIG. 7. Vickers hardness of crosslinked PABA in comparison with other materials a: functionally graded polymer composite with 45% SiC; b: heat-treated crosslinked PABA; c: common hard plastics including PVC, PMMA, polycarbonate, polystyrene and acetal; and d: heat-treated polyaniline (PANi).

Self-doped PABA was synthesized chemically as described above. For conductivity and microhardness measurements, pellets of air-dried PABA were pressed at 10,000 psi for five minutes. In order to facilitate crosslinking, the pellet was heated at 100° C. under vacuum for 24 h. Microhardness measurements (e.g., Vickers hardness) are a standard method for evaluating the mechanical properties of materials ranging from "hard" polymers to "superhard" materials such as diamond and cubic boron nitride (FIG. 7) (Veprek, 1999, J Vac Sci Technol A 17: 2401-2420). This kind of measurement is especially useful for characterizing polymers since it is related to yield stress, modulus of elasticity, and some secondary relaxation transitions (Zamfirova et al., 2003, J Appl Poly Sci 88: 1794-1798). Common "hard" plastics typically exhibit hardness values≤0.3 GPa (Crawford, 1982, Polym Test 3: 37-54). In order to achieve increased hardness, more complex materials such as functionally graded polymer composites containing significant amounts of much harder fillers (FIG. 7) have been explored (Krumova, 2001, Compos Sci Technoi 61: 557-563).

The hardness values obtained for air-dried and heat-treated PABA pellets were 0.3 and 0.5 GPa, respectively. These values are dramatically higher than polyaniline (<0.03 GPa) and those reported for other bulk polymers (FIG. 7) and approach values achieved with composites. The increase in hardness of the heat-treated PABA is a result of increased crosslinking facilitated by heating and removal of water (a product of the crosslinking reaction) under vacuum.

In a preferred embodiment, the hardness of the polymer ranges from 0.03 to 0.5 GPa. In other embodiments, the hardness is at least 0.03 GPa or at least 0.04 GPa or at least 0.05 GPa or at least 0.06 GPa.

Figure 8:
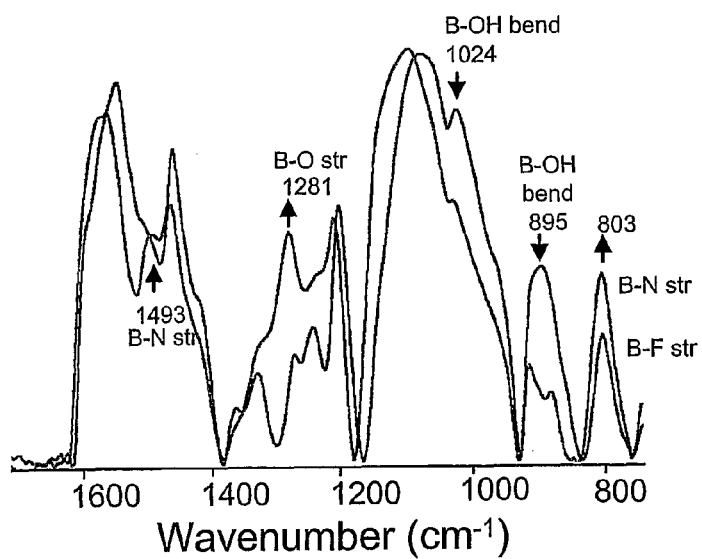
FIG. 8 Fourier-transform infrared attenuated total reflectance absorption spectra of PABA pellet (-) air-dried and (-) heat-treated.

Infrared attenuated total reflectance spectra (FIG. 8) of air-dried and heat-treated PABA pellets reveal changes consistent with increased crosslinking while maintaining the basic polyaniline structure. Vibrations characteristic of polyaniline are observed at 1597, 1462 and 1130 cm−1 and correspond to quinoid, benzenoid and C—N stretching ring modes, respectively (Epstein et al., in Spectroscopy of Advanced Materials, John Wiley & Sons, New York: 1991). In aromatic boronic acids, B—OH bending modes are observed at 895 and 1024 cm−1, while the vibration attributed to B—F stretching mode lies at 803 cm−1 (Socrates, in Infrared Characteristic Group Frequencies, John Wiley & Sons, New York: 1994). The spectrum of the heat-treated pellet shows a decrease in B—OH bending modes and an additional peak at 1493 cm−1 assigned to a B—N stretching mode (Colthup et al., in Introduction to Infrared and Raman Spectroscopy, Academic Press, London: 1975; Chen et al., 1998, J Phys Org Chem 11: 378-386). Also, there is an increase in the intensity of 1281 and 803 cm−1 vibrations assigned to B—O and the B—N stretching mode of a dative bond (Colthup et al., in Introduction to Infrared and Raman Spectroscopy, Academic Press, London: 1975; Chen et al., 1998, J Phys Org Chem 11: 378-386). While B—F and B—N stretching modes overlap at 803 cm−1, the increase in intensity can only be associated with an increase in the formation B—N dative bonds. All of the spectral observations are consistent with increased crosslinking involving the formation of boronic acid anhydride and boron-nitrogen dative bonds (FIG. 6B).

Furthermore, the relatively unchanged ratio of vibrations at 1597 and 1462 cm−1 indicate that the ratio of quinoid to benzenoid structures in the film remains the same after heat treatment; hence, the polymer remains in an oxidized state.

The conductivity of PABA was measured using a four-point-probe apparatus. The heat-treated PABA pellet had a value of 0.09 S-cm−1, similar to the conductivity of sulfonated (self-doped) polyaniline which is reported in the range of 0.017 to 0.77 S-cm−1 for 15 to 26 mol % degree of substitution respectively (Han et al., 2003, Macromolecules 36: 7908-7915): However, the conductivity of HCI-doped polyaniline dropped approximately two orders of magnitude upon heat treatment. This is consistent with reports of the loss of the HCI dopant at these temperatures (Wei et al., 1989, J Polym Sci, Part A: Polym Chem 27: 4351-4363). The fact that PABA loses only about a third of its conductivity after heat treatment further supports the creation of an anionic crosslink site involving four-coordinate boron (FIG. 6B).

Figure 9:
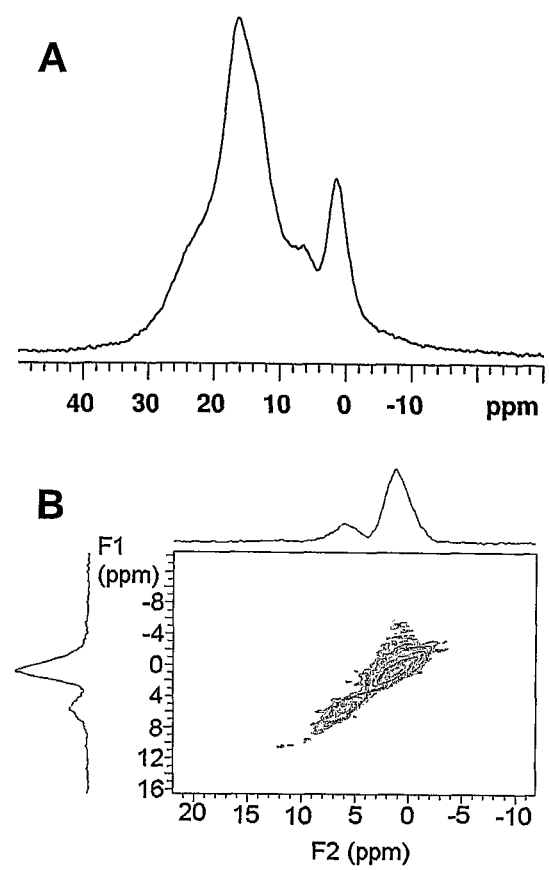
FIG. 9 $^{11}$B NMR spectra of heat-treated PABA pellet obtained at 192.4 MHz (14.1 T). A One-dimensional MAS experiment. B Two-dimensional sheared MQMAS experiment optimized to preferentially excite four-coordinate boron sites (displayed region).

Magic-angle spinning (MAS) $^{11}$B NMR is an ideal method for quantifying the coordination environment of boron (Wrackmeyer, in Annual Reports on NMR Spectroscopy, Academic Press, London: 1988). At sufficiently high magnetic fields (i.e., ≥11.7 T) the signals corresponding to three- and four-coordinate boron are generally resolved and yield relative populations by direct peak integration. While the application of MAS NMR to conducting samples is rare due to the potential for sample heating during rapid spinning and probe damage from the requisite high radiofrequency fields, no anomalous effects were observed in the present case. In the $^{11}$B spectrum (FIG. 9A) obtained for heat-treated PABA, the three-coordinate boron gives rise to the broad signal centered at 16.5 ppm, and the four-coordinate boron produces a sharper peak at 1.5 ppm. A two-dimensional multiple-quantum (MQ) MAS experiment used to filter the three-coordinate boron signal (Frydman and Harwood, 1995, J Am Chem Soc 117: 5367-5368) reveals that two four-coordinate boron sites are present in the sample (FIG. 9B), one of which—located at 6.6 ppm—is partly obscured by the quadrupole-broadened three-coordinate boron signal in the MAS spectrum. While the precise identities of the four-coordinate boron species are unclear, the chemical shifts are consistent with the local atomic connectivities indicated in FIG. 6. Fitting the one-dimensional MAS spectral intensities using the site information from the two-dimensional MQMAS experiment reveals that 21±2% of the boron in the sample is four-coordinate. Since such sites can act as a dopant (FIG. 6B), the NMR results suggest that the heat-treated polymer is doped to that level, which is sufficient to account for the measured conductivities based on other forms of self-doped polyaniline (Han et al., 2003).

Three-coordinate boron. The $^{11}$B quadrupolar coupling constant, $C_Q$ is 3.9±0.1 MHz and the quadrupolar asymmetry parameter, η≥0.65, based on a central-transition lineshape simulation of the one-dimensional MAS spectrum, assuming that it is a single site (STARS, Varian, Inc.). The two-dimensional MQMAS experiment optimized to detect three-coordinate boron indicates only a single three-coordinate boron species, although geometry distributions are evident due to the amorphous nature of the material. The measured $C_Q$ is somewhat larger than in pure borates (i.e., $BO_3$ is usually 2.5-2.7 MHz) (Bray and Petersen, 1998, Naturforsch., A: Phys Sci 53a: 273-284) but consistent with the increase in $C_Q$ documented for carbon-bound borates (Bryce et al., 2001, J Phys Chem A 105: 3633-3640). The sizeable value of η indicates an asymmetric bonding environment, typified by the different bond strengths represented in FIG. 6. The isotropic chemical shift is 27.3±0.4, ppm, which is in the region expected for carbon-bound trigonal boron (Wrackmeyer, 1988).

Four-coordinate boron. The four-coordinate boron sites are characterized by $C_Q$<0.8 MHz, an upper limit assessed by their position in the MQMAS spectrum, and by assuming that the full width of the observed signals in the MAS spectrum are caused by second-order quadrupolar broadening. This relatively small $C_Q$ is consistent with measured values of four-coordinate boron (Bryce et al., 2001) but provides little information on the nature of the connectivity. The quadrupolar asymmetry parameter, η, is difficult to measure precisely by this method in an amorphous material, and remains undefined. The isotropic chemical shifts are 1.7±0.1 ppm and 6.7±0.2 ppm. Although no suitably analogous compounds have been reported in the literature, extensive $^{11}$B NMR work has established chemical shift ranges for such sites (i.e., bound to N, C, OH, and/or F) to extend from −5 to +8 ppm (Wrackmeyer, 1988), offering no clear basis for a more precise assignment.

In summary, we report a new strategy for the generation of a crosslinked, self-doped conducting polymer. By having a negatively charged crosslink site that can simultaneously act as a dopant, this approach circumvents major obstacles encountered using traditional methods of crosslinking. Furthermore, no fillers or other nonconducting crosslinking agents are required, that will ultimately reduce conductivity. We demonstrate this method by self-crosslinking PABA, which results in the creation of four-coordinate boron through the formation of a dative boron-imine bond. Under unoptimized conditions, the percentage of four-coordinate boron and in turn the level of doping is estimated to be 21%. In addition to retaining a significant degree of conductivity, the crosslinked PABA exhibits unprecedented hardness, surpassing more common "hard" polymers.

Preparation of Materials: Polymerization was performed in water under ambient conditions. Ammonium persulfate (40 mM) was added slowly over the period of 10 minutes to a solution containing 3-aminophenylboronic acid (40 mM), sodium fluoride (40 mM) and excess D-fructose (10 M). The resulting water-soluble polymer precipitated upon dilution in pure water. Following filtration and rinsing with water, the precipitate was washed with 0.5 M HCl to remove D-fructose, and dried in air.

Characterization: Atomic percent of boron and fluorine in a heat-treated pellet was determined by XPS of a freshly polished surface. Survey spectra were obtained on a Physical Electronics Quantera using monochromatic Al Kα x-rays (25.5 W, 100 micron spot size), a take-off angle of 45°, and a pass energy of 280 eV. The ratio of integrated areas of the B1s and F1s peaks and corresponding sensitivity factors yielded a B:F ratio of approximately 2:1, indicating that a significant amount of fluoride remains complexed in the polymer, even after washing.

The $^{11}$B NMR spectrum of the coarse-ground pellet (14 mg) was obtained at 192.4 MHz (14.1 T) on a Varian Inova 600 spectrometer. For the one-dimensional MAS experiment spinning at 12 kHz, a pulse of 1.5 μs with a radiofrequency (rf) field of 25 kHz (<15° tip angle) was used to ensure homogeneous excitation of all boron sites (Samoson and Lippmaa, 1983, Phys Rev B 28: 6567-6570). The spectrum is the result of 800 transients separated by a relaxation delay of 10s; For the two-dimensional MQMAS spectrum, multiple-quantum excitation and conversion were achieved using 7 μs and 3 μs pulses with an 83 kHz rf field, respectively, and a 15 μs z-filter at 8 kHz rf. 128 t1 increments of 24 transients each were collected on a sample spinning at 18182 Hz. No $^1$H or $^{19}$F decoupling was required to achieve optimal peak narrowing at these spinning speeds. The sample temperature was maintained at 22° C. The chemical shift axis is presented relative to $BF_3$—$OEt_2$, as measured by secondary reference 0.1 M boric acid, which appears at +19.6 ppm. Relative populations of four- and three-coordinate borons were evaluated by direct integration of the two major peaks, and corrected for small effects arising from multiple transitions present in the quadrupolar $^{11}$B spins (Massiot et al., 1990, J Magn Reson 90: 231-242).

While the preferred embodiments of the invention have been described above, it will be recognized and understood that various modifications may be made therein, and the appended claims are intended to cover all such modifications which may fall within the spirit and scope of the invention.

TABLE 1

$^{11}$B NMR chemical shifts of 3-aminophenylboronicacid (3-APBA) adducts

| Solution Conditions (ppm) | $^{11}$B chemical shift |
|---|---|
| 40 mM 3-APBA (pH = 7.4) | 29.2 |
| 40 mM 3-APBA + 40 mM NaF + 10 M Fructose (pH 7.4) | 6.4 |

Shifts measured relative to reference borontrifluoride etherate

The invention claimed is:

1. A boronic acid substituted polyaniline polymer-saccharide complex comprising:
   a boronic acid substituted polyaniline polymer; and
   a saccharide,
   wherein the saccharide is complexed to the boronic acid of the polyaniline polymer and the boronic acid of the polyaniline polymer is complexed with a fluoride, and wherein the polyaniline polymer-saccharide complex is water-soluble, in a self-doped form, and has a molecular weight of at least 100,000.

2. The polyaniline polymer-saccharide complex according to claim 1, wherein a dried film of the self-doped polyaniline polymer-saccharide complex has a hardness of at least 0.03 GPa.

3. A polyaniline polymer-saccharide complex comprising repeating units as shown below:

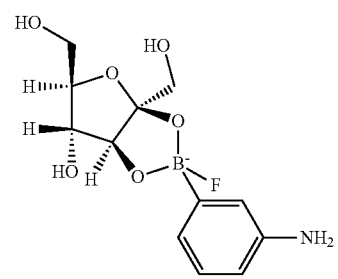

wherein the polyaniline polymer-saccharide complex is water-soluble, in a self-doped form, and has a molecular weight of at least 100,000.

4. The polyaniline polymer-saccharide complex according to claim 3, wherein a dried film of the self-doped polyaniline polymer-saccharide complex has a hardness of at least 0.03 GPa.

5. A method of making a self-doped polyaniline comprising:
(a) providing a monomer:

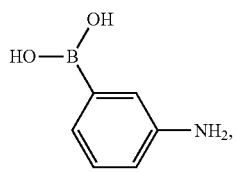

D-fructose and fluoride;
(b) incubating said monomer, the D-fructose and the fluoride under conditions suitable for polymerization, thereby producing a first polymer:

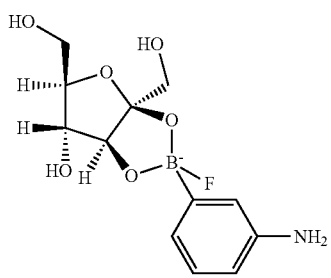

(c) precipitating said polymer by reducing the fluoride concentration, thereby producing a second polymer:

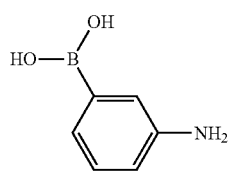

6. The method according to claim 5 including:
(d) heating the second polymer, thereby forming a cross-linked polymer.
7. The method according to claim 5 having a hardness of at least 0.03 GPa.
8. The method according to claim 5 having a molecular weight of at least 10,000.
9. The method according to claim 5 having a molecular weight of at least 100,000.
10. The polyaniline polymer-saccharide complex according to claim 1 wherein the saccharide is D-fructose.
11. The polyaniline polymer-saccharide complex according to claim 1, wherein a dried film of the self-doped polyaniline polymer-saccharide complex has a hardness of at least 0.04 GPa.
12. The polyaniline polymer-saccharide complex according to claim 1, wherein a dried film of the self-doped polyaniline polymer-saccharide complex has a hardness of at least 0.05 GPa.
13. The polyaniline polymer-saccharide complex according to claim 1, wherein a dried film of the self-doped polyaniline polymer-saccharide complex has a hardness of at least 0.06 GPa.
14. The polyaniline polymer-saccharide complex according to claim 1 having a molecular weight of at least 1,000,000.
15. The polyaniline polymer-saccharide complex according to claim 3, wherein a dried film of the self-doped polyaniline polymer-saccharide complex has a hardness of at least 0.04 GPa.
16. The polyaniline polymer-saccharide complex according to claim 3, wherein a dried film of the self-doped polyaniline polymer-saccharide complex has a hardness of at least 0.05 GPa.
17. The polyaniline polymer-saccharide complex according to claim 3, wherein a dried film of the self-doped polyaniline polymer-saccharide complex has a hardness of at least 0.06 GPa.
18. The polyaniline polymer-saccharide complex according to claim 3 having a molecular weight of at least 1,000,000.
19. The polyaniline polymer-saccharide complex according to claim 14, wherein a dried film of the self-doped polyaniline polymer-saccharide complex has a hardness of at least 0.06 GPa.
20. The polyaniline polymer-saccharide complex according to claim 18, wherein a dried film of the self-doped polyaniline polymer-saccharide complex has a hardness of at least 0.06 GPa.
21. The polyaniline polymer-saccharide complex according to claim 10, wherein a dried film of the polyaniline polymer-saccharide complex has a hardness of at least 0.06 GPa and the polyaniline polymer-saccharide complex has a molecular weight of at least 1,000,000.
22. The polyaniline polymer-saccharide complex according to claim 1, wherein a dried film of the self-doped polyaniline polymer-saccharide complex has a hardness of from 0.3 GPa to 0.5 GPa.
23. The polyaniline polymer-saccharide complex according to claim 3, wherein a dried film of the self-doped polyaniline polymer-saccharide complex has a hardness of from 0.3 GPa to 0.5 GPa.
24. The polyaniline polymer-saccharide complex according to claim 1, wherein a dried film of the self-doped polyaniline polymer-saccharide complex has a hardness of from 0.3 GPa to 0.5 GPa and the polyaniline polymer-saccharide complex has a molecular weight of from 100,000 to 2,000,000.
25. The polyaniline polymer-saccharide complex according to claim 3, wherein a dried film of the self-doped polyaniline polymer-saccharide complex has a hardness of from 0.3 GPa to 0.5 GPa and the polyaniline polymer-saccharide complex has a molecular weight of from 100,000 to 2,000,000.

* * * * *